Patented Dec. 29, 1953

2,664,397

UNITED STATES PATENT OFFICE 2,664,397

ION-EXCHANGE RESINS FROM CARBOXY-ALKYL CELLULOSE ETHERS

William M. Hutchinson, Bartlesville, Okla., assignor to Phillips Petroleum Company, a corporation of Delaware No Drawing. Application September 16, 1947, Serial No. 774,423

7 Claims. (Cl. 210—24)

This invention relates to ion-exchange resins. In a more specific aspect it relates to a new and novel ion-exchange resin material and a method for its production. In a still more specific aspect it relates to new chemical compounds useful as ion-exchange resins and a method for their production from carboxyalkyl cellulose.

In the past, either the synthetic or naturally occurring sodium silico-aluminate sands have been used for softening water. These compounds are known as zeolite water softeners and are capable of replacing the calcium and magnesium ions, which cause water hardness, with sodium ions. As sodium compounds, the minerals are harmless since they are quite soluble in water and do not react with soaps to form an insoluble curd.

More recently synthetic ion-exchange resins are finding useful applications in industry for the production of demineralized water for processing, or for the recovery of valuable materials from dilute solutions, such as, metal ions from dilute waste liquors or washings. In the production of demineralized water, ion-exchange resins may be profitably employed because the throughput per unit volume of equipment in ion-exchange systems is greater than in specifically designed stills or equipment designed to utilize industrial condensate. In many cases the degree of purity realized in distilling equipment is greater than necessary for the process at hand and costs may be accordingly high.

Deionizing agents now available are proving to be a valuable addition to distillation as a method of providing very pure water. The soluble salts in the water being treated are converted to their corresponding acids by passage through a hydrogen ion-exchanger, and the acids thus produced are removed by adsorbents. The success of this process for the economical production of large quantities of very pure water appears to be assured and its adoption has solved many industrial water conditioning problems.

Ion-exchange resins used in ion-concentrating installations are serving the cellulose acetate, plastic, chemical, drug, cosmetic and synthetic rubber manufacturing industries as well as the mirror silvering and similar industries. In demineralizing units, they are furnishing non-scaling boiler feed, condenser coolants, and the like for power installations.

One object of my invention is to provide new ion-exchange resins.

Another object of my invention is to provide a method for the production of my new cation-exchange resins.

Still another object of my invention is to provide new cation-exchange resins adaptable for removing acids, alkalis, or calcium and magnesium ions from water.

Yet another object of my invention is to provide cation-exchange resins which after becoming spent or substantially spent with respect to removal of one or more cations from a water being treated may be regenerated for reuse for the same or for other service.

Still other objects and advantages of my new resins, method of their production and their use will be appreciated by those skilled in the art upon reading the following disclosure and appended claims.

I have discovered that acyl groups may be introduced into carboxyalkyl cellulose molecules to produce compounds which are useful as cation-exchange resins. These resins may be utilized in the purification of water and for other processes wherein removal or segregation of cations from aqueous media is desired, and they can be easily regenerated by treatment with dilute acid, base or salt solutions, depending upon their application.

For example, a carboxyalkyl cellulose may be admixed with acetic anhydride and a catalytic quantity of sodium acetate in a suitable reactor. At the end of the reaction substantially all of the free hydroxyl groups in the carboxyalkyl cellulose molecule have been acetylated, that is, reacted with the acetyl radical of the acetic anhydride. I can use acetyl chloride as the acylating agent as well as the acetic anhydride.

When the reactants are a carboxyalkyl cellulose and acetic anhydride, the reaction product is produced in the form of small, white, porous granules which can be filtered from the reaction mixture, washed and dried.

According to the process of my invention, one part by weight of a carboxyalkyl cellulose of a degree of substitution of about 0.5 is admixed with 1 to 20 parts by weight of acetic anhydride and a catalytic quantity of sodium acetate in a suitable reactor. By catalytic quantity I mean such a quantity of sodium acetate as will promote the reaction desired, such as from about 0.05 to 0.5 parts by weight. The mixture is maintained at a temperature between about 68° to 284° F. for a period of from ¼ to 24 hours. At the end of this period, substantially all of the free hydroxyl groups in the carboxyalkyl cellulose molecule have been acetylated. The product exists, as mentioned above, as small, white, porous granules, which may be filtered off, washed and dried.

Although the conditions listed above lie within the scope of this invention, I prefer to use a carboxyalkyl cellulose, acetic anhydride and sodium acetate in a ratio by weight of 1:10:0.1 and to operate in a temperature range of about 205° to 220° F. In some instances it may be found desirable to carry out the reaction without the sodium acetate catalyst.

When working at temperatures as high as 284° F., a reflux condenser or suitable pressure should be used to avoid loss of the acetic anhydride from the reactor.

When using equal parts by weight of a carboxyalkyl cellulose and acetic anhydride, it may be desirable to use a non-reactive solvent or a solvent having no free hydroxyl groups such as benzene, alpha-reference fuel or the like. Such an inert solvent serves the purpose of providing a medium which enables the reactants to be commingled more easily.

The carboxyalkyl cellulose used in my invention may be obtained from any source or made by any method as long as a product of good quality is produced. The mesh or grain of the acylated product is dependent upon the mesh or grain size of the carboxyalkyl cellulose used in its preparation. The acylated material may be ground to produce finer sizes if such are desired.

By an acyl group I mean the group (RCO) in which R is an alkyl radical, like methyl ($CH_3$), ethyl ($C_2H_5$), propyl ($C_3H_7$), etc. Such groups are present in the acid chlorides and acid anhydrides of such acids as acetic acid, propionic acid, butyric acid, etc. Generically, these groups (RCO) are called "acyl" groups. When applied specifically to the acyl group of acetic acid, the group is frequently termed the "acetyl" group, and the term "acylation" then becomes "acetylation." Other organic acid halides can be used as acylating agents.

For purposes of explanation, I offer the following as the mechanism or process of the reaction, but I do not wish to be limited thereby, since the mechanism may be different or the reaction follow a different path, but yielding results as herein disclosed.

The acylating (or acetylating reaction in case the acylating agent is acetic anhydride or acetyl chloride) reaction is believed to be

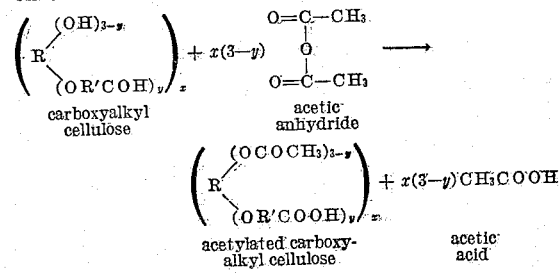

in which $R = C_6H_7O_2$ (the cellulose residue), $R'$ = an alkylene group, and $x$ is the number of units in a cellulose molecule. There are 3 hydroxyl groups with each cellulose residue, and $y$ represents the number of such hydroxyl groups which have had their hydrogen replaced by $R'COOH$ in the preparation of the ether derivative of the cellulose. Consequently the subscript "$3-y$" as applied to the (OH) groups means that "$3-y$" OH groups were not etherized and these of course remain merely as hydroxyl groups. The letter "$y$" represents the "degree of substitution" of the cellulose. In the example above, it was stated that the degree of substitution of a carboxyalkyl cellulose was 0.5, and hence "$y$" in the above equation is therefore 0.5.

If the hydrogen from one hydroxyl group from each glucose unit were replaced by an ethereal group, the degree of substitution is therefore "1," and this degree of substitution is quite high.

Carboxyalkyl cellulose obtainable on the market or ordinarily as prepared in the laboratory have a degree of substitution of from about 0.3 to 0.7.

The conversion of the unetherized hydroxyl groups to the acetate groups is believed to be substantially complete according to the above reaction.

By the term "alkylene group" is meant, for example, a $=C_2H_4$ group. The ethyl group is $-C_2H_5$, but additional substitutions may be made by substituting various groupings for any number of H atoms, hence in this type of cellulosic ether one H atom from the ethyl group is replaced by a carboxyl, leaving an alkylene group indicated by the symbol $R'$. This same holds for methyl, propyl and all alkyl groups.

When carrying out the reaction with an acyl chloride, such as acetyl chloride ($CH_3COCl$) or other organic acid halide, the mechanism of the reaction is believed to be

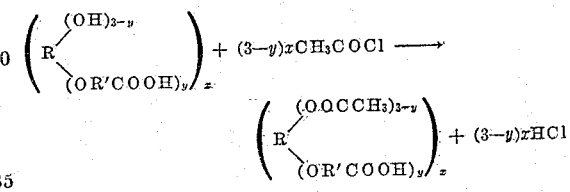

The symbols R, $R'$, $y$ and $x$ have the same meanings as defined hereinbefore. When using the acyl chloride reagent the same catalysts may be used to promote the reaction as were mentioned for use with the organic acid anhydride reagent.

As catalysts for the reaction, pyridine, tetramethyl ammonium hydroxide, and similar basic compounds may be employed in low concentrations as well as the sodium acetate mentioned hereinbefore. Although catalytic materials are not absolutely essential to the reaction, their use is preferred since it increases the time rate of conversion of carboxyalkyl cellulose to their corresponding acylated forms.

Metal or ammonium salts of the carboxyalkyl cellulose or the free acids themselves may be employed in the preparation of the cation-exchange resins as herein disclosed.

*Example I*

As a specific example of the preparation of an cation-exchange resin as herein disclosed, I mix 1 gram of beta-carboxyethyl cellulose of a degree of substitution of about 0.5, with 10 grams acetic anhydride and 0.1 gram sodium acetate. This mixture is thoroughly agitated in a suitable reactor heated to 212° F. and maintained at that temperature for ½ hour. The reaction mixture is then cooled to room temperature and the product removed by filtration. The material remaining on the filter is small, white, porous granules and these are washed with distilled water, then with a 10% aqueous sodium hydroxide, and finally with water until the washings no longer show an alkaline reaction. This resin is insoluble in dilute base, dilute acid, acetone or ethanol and does not soften below 375° F.

Carboxymethyl cellulose, sodium or other alkali metal salt of carboxymethyl cellulose or of carboxyethyl cellulose, carboxypropyl cellulose or alkali metal salt thereof, or other carboxyalkyl cellulose or salts thereof, including ammonium salts may be used as herein disclosed for preparing cation-exchange resins.

*Example II*

The cation-exchange activity of the resin as prepared in Example I was tested by adding dilute acid and dilute base to a suspension of the resin in water and measuring the pH of the aqueous solution over a period of time. In addition, the free acid resin was contacted with a sodium chloride solution and the change in pH measured.

The following tabulation illustrates the cation-exchange properties of the resin.

Approximately 0.5 gram of acid washed resin was suspended in 100 ml. of water and the suspension agitated by a mechanical stirrer. The acid and base solutions added were 0.5 N.

| Time, min. | Added Ml. acid | Added Ml. base | pH |
|---|---|---|---|
| Resin in water | | | |
| 0 | | | 3.6 |
| 3 | | 1.3 | 4.36 |
| 4 | | | [1] 4.32 |
| 5 | | 2.74 | 10 |
| 6 | | | 7.50 |
| 7 | | | 6.47 |
| 18 | | | [1] 6.32 |
| 19 | 1.03 | | 4.96 |
| 20 | | | 5.40 |
| | | | [1] 5.62 |

[1] Approximate equilibrium points.

As given in this table, the pH of the suspension of resin in water at the starting of this test was 3.6. At zero time 1.3 ml. of 0.5 N base was added and the pH was determined immediately and found to be 4.36. The addition of base would be expected to increase the pH, however, after 3 minutes of time, the pH of the suspension decreased from a high of 4.36 to about 4.32. The following reaction is believed to illustrate the cation-exchange when pH decreases following addition of sodium hydroxide (1) $\quad RCOOH + NaOH \longrightarrow RCOONa + H_2O$

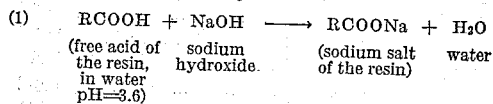

The consumption of free NaOH would permit a decrease in pH.

At 4 minutes 2.74 ml. NaOH solution were added giving a momentarily high pH of 10 (alkaline solution). After one minute (5 minutes of elapsed time) sufficient of this added NaOH had been consumed to give a resultant pH reading of 7.50, after another minute pH was 6.47, and another pH was about 6.32. With the passage of more time a further decrease in pH occurred but was not recorded until after 18 minutes when 1.03 ml. of 0.5 N HCl was added, and an immediate pH reading was 4.96. One minute after addition of the HCl (19 minutes elapsed time) the pH had increased from 4.96 to 5.40 indicating that acid was being consumed by the resin. This consumption of acid is believed to be as follows, and is based upon the amount of the sodium salt of the carboxyethyl cellulose formed during and following the additions of NaOH to the original free acid (2) $\quad RCOONa + HCl \longrightarrow RCOOH + NaCl$

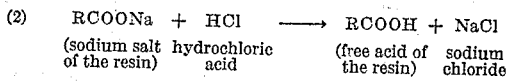

The consumption of free HCl should be and is accompanied by a rise in pH, since NaCl has little to no effect on pH.

After the passage of 20 minutes an excess of acid was added to the resin to convert the resin to its original acid form. The resin was then filtered from the salt solution and washed with water, and the so-treated resin was then used for the cation-exchange removal of sodium ions from a dilute salt solution, as follows:

| Time, min. | Added g. NaCl | pH |
|---|---|---|
| 0 | 0.1 | 4.00 |
| 1 | | 3.92 |
| 2 | | [1] 3.89 |
| 3 | 0.1 | 3.82 |
| 4 | | 3.78 |
| 5 | | |
| 17 | 0.2 | [1] 3.76 |
| | | 3.54 |

[1] Approximate equilibrium point.

The following equation is believed to account for the decrease in pH (increase of acidity) upon addition of sodium chloride, (3) $\quad RCOOH + NaCl \longrightarrow RCOONa + HCl$

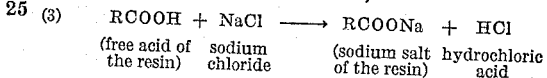

the liberation of free hydrochloric acid should decrease the pH of the solution while the consumption of sodium chloride has no effect.

My ion-exchange resin may also be used to remove the elements of hardness, Ca and Mg, from water containing them. To illustrate this water softening reaction, a portion of the ion-exchange resin prepared in Example I was used.

To this resin was added 5 ml. of tap water and the suspension allowed to stand for a given length of time, after which the resin was filtered off and a standard soap-hardness test made on the 5 ml. filtrate. The original tap water required 38 drops of a standard soap solution to yield suds which were stable for 1 minute.

| Contact time with 5 ml. fresh tap water, min. | Drops standard soap solution required for 1 min. suds |
|---|---|
| 0 | 38 |
| 1 | 26 |
| 3 | 20 |
| 5 | 16 |
| 7 | 15 |
| 15 | 10 |
| 30 | 8 |
| Blank (distilled water) | 2 |

By subtracting the blank from the drop values it is seen that the raw tap water required 36 drops soap solution for one minute suds. When 5 ml. of tap water were treated for 15 minutes with my cation-exchange resin (sodium salt) only 10 drops of soap solution were required to give one minute suds, indicating that a large proportion of the cations responsible for the hardness of water had been removed.

Other alkali metals are the full equivalent of sodium in relation to the ion exchange resin as herein described. The sodium ion and the sodium salt of the resin were merely used in an exemplary manner.

From the above tests it will be obvious to those skilled in the art that my resins made from a carboxyalkyl cellulose may be used for cation exchange purposes, as hereinbefore illustrated. Method of manufacture of the resin may be varied within the skill of the art, as well as their application to specific problems and yet remain within the intended spirit and scope of my invention.

I wish to be limited only by the appended claims.

Having disclosed my invention, I claim:

1. The chemical compound characterized by the following formula

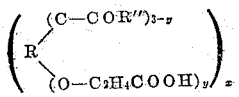

in which R represents the cellulose residue $C_6H_7O_2$, R'' represents a 1 to 3 carbon atom alkyl radical, $y$ is the degree of substitution, and $x$ is the number of units in a molecule.

2. The chemical compound characterized by the following formula

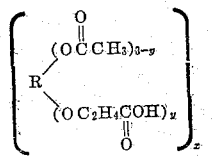

in which R represents the cellulose residue $C_6H_7O_2$, $y$ is the degree of substitution of the cellulose and $x$ is the number of units per molecule.

3. The method of removing cations from water containing said cations comprising contacting said water with a substantially insoluble cation exchange resin selected from the group of substantially insoluble cation exchange resins consisting of the free acid and alkali metal salts of the reaction product of a carboxyalkyl cellulose selected from the group of carboxyalkyl celluloses in which the alkyl radical of the carboxyalkyl group contains 1 to 3 carbon atoms and an acylating agent selected from the group of acylating agents consisting of acid anhydrides and acid halides containing the group —COR'' in which R'' represents an alkyl radical selected from the group of alkyl radicals containing from 1 to 3 carbon atoms per radical, and removing the contacted water from said reaction product.

4. The method of claim 3 wherein the acylated carboxyalkyl cellulose is produced by reacting said carboxyalkyl cellulose and said acylating agent at a temperature between the limits of 68° and 284° F. for a period of ¼ to 24 hours.

5. The method for removing calcium and magnesium ions from water containing said ions comprising contacting water containing said ions with a substantially insoluble alkali metal salt of a compound having the following formula:

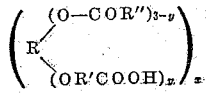

in which R represents the cellulose residue $C_6H_7O_2$, R' represents an alkylene radical selected from the group of alkylene radicals containing 1 to 3 carbon atoms per radical, R'' represents an alkyl radical containing from 1 to 3 carbon atoms, $y$ is the degree of substitution of the cellulose, and $x$ is the number of units in a molecule; and removing the contacted water from said compound.

6. The method for removing calcium and magnesium ions from water containing same comprising contacting water containing said ions with the substantially insoluble sodium salt of a compound having the following formula;

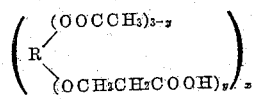

in which R represents a cellulose residue $C_6H_7O_2$, $y$ is the degree of substitution of the cellulose, and $x$ is the number of units in the molecule; and removing the contacted water from said compound.

7. The method for removing calcium and magnesium ions from water containing same comprising contacting water containing said ions with the substantialy insoluble sodium salt of a compound having the following formula

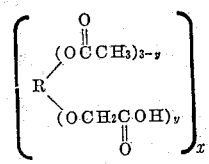

in which R represents a cellulose residue $C_6H_7O_2$, $y$ is the degree of substitution of the cellulose, and $x$ is the number of units in the molecule and recovering the contacted water, from the reaction product.

WILLIAM M. HUTCHINSON.

References Cited in the file of this patent

UNITED STATES PATENTS

| Number | Name | Date |
|---|---|---|
| 2,053,280 | Fothergill et al. | Sept. 8, 1936 |
| 2,098,335 | Dreyfus | Nov. 9, 1937 |
| 2,098,336 | Dreyfus | Nov. 9, 1937 |
| 2,128,432 | Ramage | Aug. 30, 1938 |
| 2,265,585 | Urbain et al. | Dec. 9, 1941 |
| 2,311,008 | Tucker | Feb. 16, 1943 |
| 2,340,111 | D'Alelio | Jan. 25, 1944 |
| 2,393,562 | Perech | Jan. 22, 1946 |
| 2,510,355 | Waldeck | June 6, 1950 |

FOREIGN PATENTS

| Number | Country | Date |
|---|---|---|
| 343,521 | Great Britain | of 1931 |
| 486,564 | Great Britain | June 7, 1938 |